(12) United States Patent
Human et al.

(10) Patent No.: US 11,326,908 B2
(45) Date of Patent: May 10, 2022

(54) APPARATUS FOR MEASURING WIRE AND CABLE LENGTH VIA ELECTRONIC SENSING OF REEL ROTATION IN COMMUNICATION WITH A NETWORK-CONNECTED DATABASE

(71) Applicant: Wire Pulse, Inc., Chicago, IL (US)

(72) Inventors: Andrew F. Human, Chicago, IL (US); Eric M. Martin, Chicago, IL (US)

(73) Assignee: Wire Pulse, Inc., Chicago, IL (US)

( * ) Notice: Subject to any disclaimer, the term of this patent is extended or adjusted under 35 U.S.C. 154(b) by 436 days.

(21) Appl. No.: 16/272,439

(22) Filed: Feb. 11, 2019

(65) Prior Publication Data

US 2019/0249977 A1    Aug. 15, 2019

Related U.S. Application Data

(60) Provisional application No. 62/629,649, filed on Feb. 12, 2018.

(51) Int. Cl.
| | | |
|---|---|---|
| *G01D 5/347* | (2006.01) | |
| *G01B 7/02* | (2006.01) | |
| *G01D 5/245* | (2006.01) | |
| *B65H 49/00* | (2006.01) | |
| *G01B 11/04* | (2006.01) | |
| *B65H 61/00* | (2006.01) | |

(52) U.S. Cl.
CPC ........... *G01D 5/3473* (2013.01); *B65H 49/00* (2013.01); *B65H 61/00* (2013.01); *G01B 7/026* (2013.01); *G01B 11/043* (2013.01); *G01D 5/2451* (2013.01); *G01D 5/34707* (2013.01); *G01B 2210/58* (2013.01)

(58) Field of Classification Search
CPC .. G01B 7/026; G01B 2210/58; G01B 11/043; B65H 49/00; B65H 61/00; G01D 5/2451; G01D 5/34707; G01D 5/3473
See application file for complete search history.

(56) References Cited

U.S. PATENT DOCUMENTS

| | | | |
|---|---|---|---|
| 4,447,955 A | 5/1984 | Stutz et al. | |
| 4,475,163 A * | 10/1984 | Chandler | ................ B63B 21/00 377/17 |
| 5,988,556 A | 11/1999 | Bednarczyk et al. | |
| 6,588,696 B1 | 7/2003 | Riihela et al. | |
| 8,176,593 B2 | 5/2012 | Gress et al. | |
| 9,933,474 B2 | 4/2018 | Candela et al. | |
| 2005/0247136 A1 * | 11/2005 | Cross | ....................... G01N 3/08 73/826 |
| 2013/0087086 A1 * | 4/2013 | Lizaso | ................... D05B 69/36 112/273 |
| 2016/0023863 A1 * | 1/2016 | Martin | ................. G01D 5/3473 242/563.2 |
| 2017/0241097 A1 * | 8/2017 | Sharp | ..................... E01C 19/34 |

* cited by examiner

*Primary Examiner* — Jennifer D Bennett
(74) *Attorney, Agent, or Firm* — Nyman IP LLC; Scott Nyman

(57) ABSTRACT

An apparatus for measuring wire and cable length is provided for using a wireless encoder for wire and cable processing. The apparatus for measuring wire and cable length may include a housing, battery, communication component, microcontroller, printed circuit board, encoder module, encoder disc, shaft, wire counter and spool.

15 Claims, 2 Drawing Sheets

APPARATUS FOR MEASURING WIRE AND CABLE LENGTH VIA ELECTRONIC SENSING OF REEL ROTATION IN COMMUNICATION WITH A NETWORK-CONNECTED DATABASE

CROSS-REFERENCE TO RELATED APPLICATION

This application claims the priority from U.S. provisional patent application Ser. No. 62/629,649 filed Feb. 12, 2018. The foregoing application is incorporated in its entirety herein by reference.

FIELD OF THE INVENTION

The present disclosure relates to an apparatus for measuring wire and cable length. More particularly, the disclosure relates to using a wireless encoder for wire and cable processing.

BACKGROUND

Currently there are a number of solutions for measuring information about length of wire and cable material used. Some of these solutions attempt to count wire and cable using an incremental encoder and a display screen, but these solutions fail to meet the needs of the industry because the data is not stored on a server for business analysis purposes. Other solutions attempt to track the amount of wire and cable material used by printing linear footage or other unit markings on the wire itself and checking visually after the material has paid out of the spool, machine, or dispenser, but these solutions are similarly unable to meet the needs of the industry because this is a labor intensive process and also does not keep track of the input over time without using an external input solution.

It would be desirable to have a composition that uses a digital incremental encoder that can be used to convert the material usage data into usable footage length which communicates wirelessly using a radio frequency (RF) communications protocol. Furthermore, it would also be desirable to have a composition that can display on a screen locally and also update a cloud database environment for analysis of inventory and productivity.

In the past, others in the field have unsuccessfully attempted to improve wire measuring methods by incorporating incremental encoders and adding display devices, thereby increasing the accuracy of the machine or line operators and decreasing the lost or miscounted inventory. Unfortunately, such improvements in cable length measuring methods have not overcome the inherent limitations regarding device specific display in which the user still has to update their own inventory sheet. For instance, with conventional inventory processing systems, a user must read the display screen and write down the numbers for their inventory count. This method also creates room for human error in reading or recording every action made by the measuring device.

Therefore, a need exists to solve the deficiencies present in the prior art. What is needed is a solution for measuring information about length of wire and cable material. What is needed is an apparatus to measure the length of wire or cable paid out without requiring markings on the paid-out material. What is needed is an apparatus to track the dispense of wire or cable over time. What is needed is an apparatus using radio frequency to account for dispensing of wire and cable.

SUMMARY

An aspect of the disclosure advantageously provides a solution for measuring information about length of wire and cable material. An aspect of the disclosure advantageously provides an apparatus to measure the length of wire or cable paid out without requiring markings on the paid-out material. An aspect of the disclosure advantageously provides an apparatus to track the dispense of wire or cable over time. An aspect of the disclosure advantageously provides an apparatus using radio frequency to account for dispensing of wire and cable. An apparatus enabled by this disclosure may advantageously be more economical to produce, easier to manufacture, easier to repair, and exhibit enhanced durability.

Accordingly, the disclosure may feature an apparatus for measuring a wire including an encoder disc, a shaft, an encoder module, and a microprocessor. The encoder disc may be installed to the shaft. The encoder module may detect a condition of the encoder disc and generate an electronic signal indicative of the condition. The microprocessor may be communicably connected to the encoder module to receive the electronic signal. The microprocessor may analyze the electronic signal to determine information relating to a payout of the wire.

In another aspect, a communication component may be included to communicate the information with a network-connected database.

In another aspect, a printed circuit board may be included onto which the encoder module and the communication component may be communicably installed.

In another aspect, the information may be viewable via a display.

In another aspect, the condition of the encoder disc may include rotation.

In another aspect, the encoder module may include an emitting portion to emit light, and a sensing portion to sense the light.

In another aspect, the encoder disc may include a slot, and at least part of the light emitted by the emitting portion may pass through the slot prior to being sensed by the sensing portion.

In another aspect, a load may be installable to the shaft distal to the encoder disc.

In another aspect, a battery may be included.

According to an embodiment of this disclosure, an apparatus may be provided for measuring a material including a encoder disc, an encoder module, a microprocessor, communication component, and a printed circuit board. The encoder disc may be installed to a shaft. The encoder module may detect a condition of the encoder disc and generate an electronic signal indicative of the condition. The microprocessor may be communicably connected to the encoder module to receive the electronic signal and analyze the electronic signal to determine information relating to a payout of the material. The communication component may communicate the information with a network-connected database. The encoder module and the communication component may be communicably installed to the printed circuit board.

In another aspect, the information may be viewable via a display.

In another aspect, the condition of the encoder disc may include rotation.

In another aspect, the encoder module may include an emitting portion to emit light, and a sensing portion to sense the light.

In another aspect, the encoder disc may include a slot. At least part of the light emitted by the emitting portion may pass through the slot prior to being sensed by the sensing portion.

In another aspect, a load may be installable to the shaft distal to the encoder disc.

In another aspect, a battery may be included.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
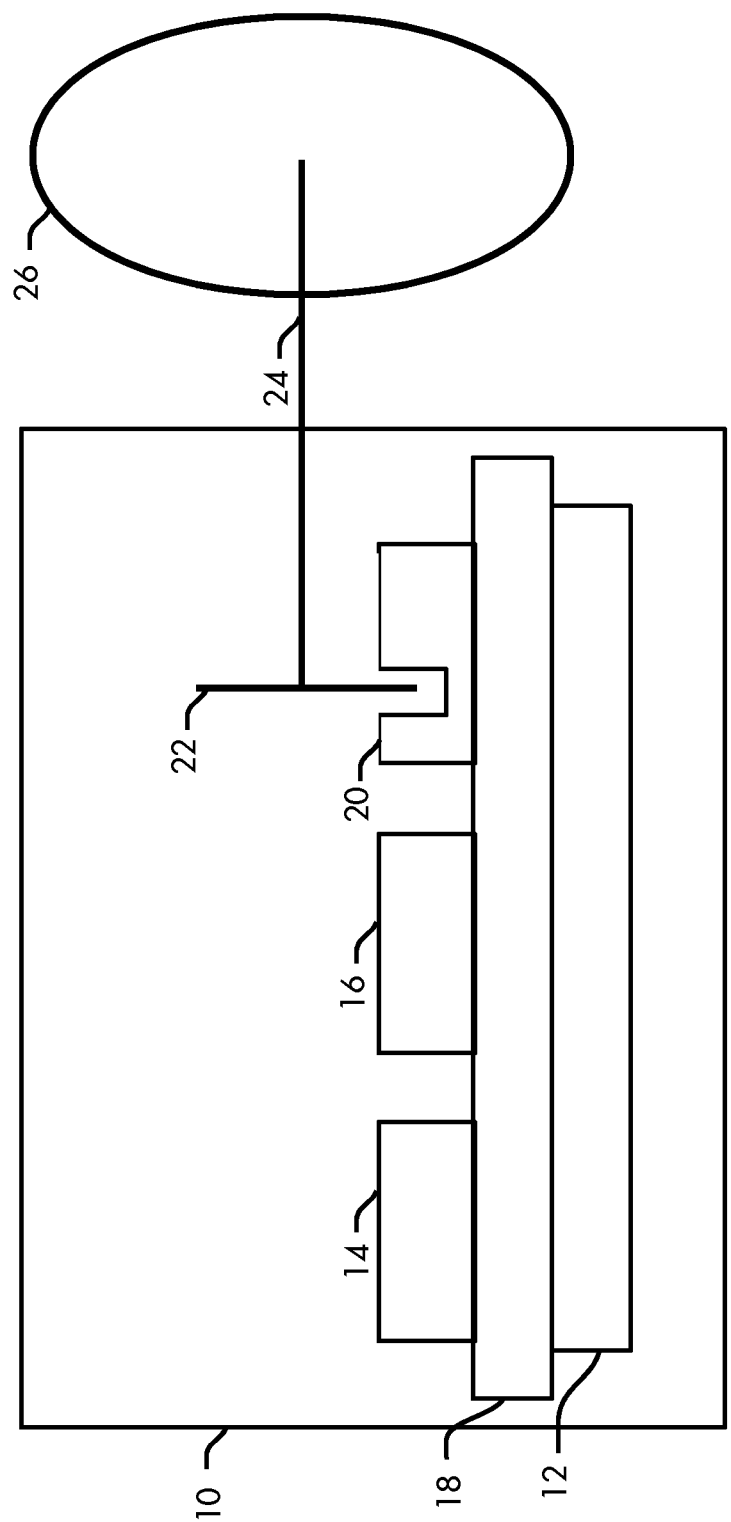
FIG. 1 is a side elevation view of a measuring device showing internal components, according to an embodiment of this disclosure.

The following disclosure is provided to describe various embodiments of an apparatus for measuring wire and cable length. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, an apparatus for measuring wire and cable length will be discussed. Those of skill in the art will appreciate alternative labeling of the apparatus for measuring wire and cable length as a measuring device, cable measuring device, wire payout monitoring and tracking device, the invention, or other similar names. Similarly, those of skill in the art will appreciate alternative labeling of the apparatus for measuring wire and cable length as a wire measuring method, wire and cable payout monitoring technique, wireless wire and cable monitoring method, method, operation, the invention, or other similar names. Skilled readers should not view the inclusion of any alternative labels as limiting in any way.

An apparatus enabled by this disclosure advantageously fills the deficiencies of the inadequacies currently known of prior offerings in the art by providing an apparatus for measuring linear footage of wire and cable that may wirelessly connect to another device for display purposes and historic analysis of usage and productivity. An apparatus enabled by this disclosure may include a mechanical component and an electronic component, which may operate collectively to transform information. For example, the mechanical component and the electronic component may convert a physical input of a counting wheel into digital data.

An apparatus enabled by this disclosure may advantageously be used to improve productivity and transparency in an organization by updating an associated database with accurate inventory and other information relating to the payout of a product. This advantage may assist with creating a digital inventory and usage environment which can be analyzed or prompted virtually anywhere an internet connection exists. Furthermore, it should be noted that this device is not industry specific and can be used for wire and cable processing, packaging processing, and for many other applications in manufacturing environments.

Figure 2:
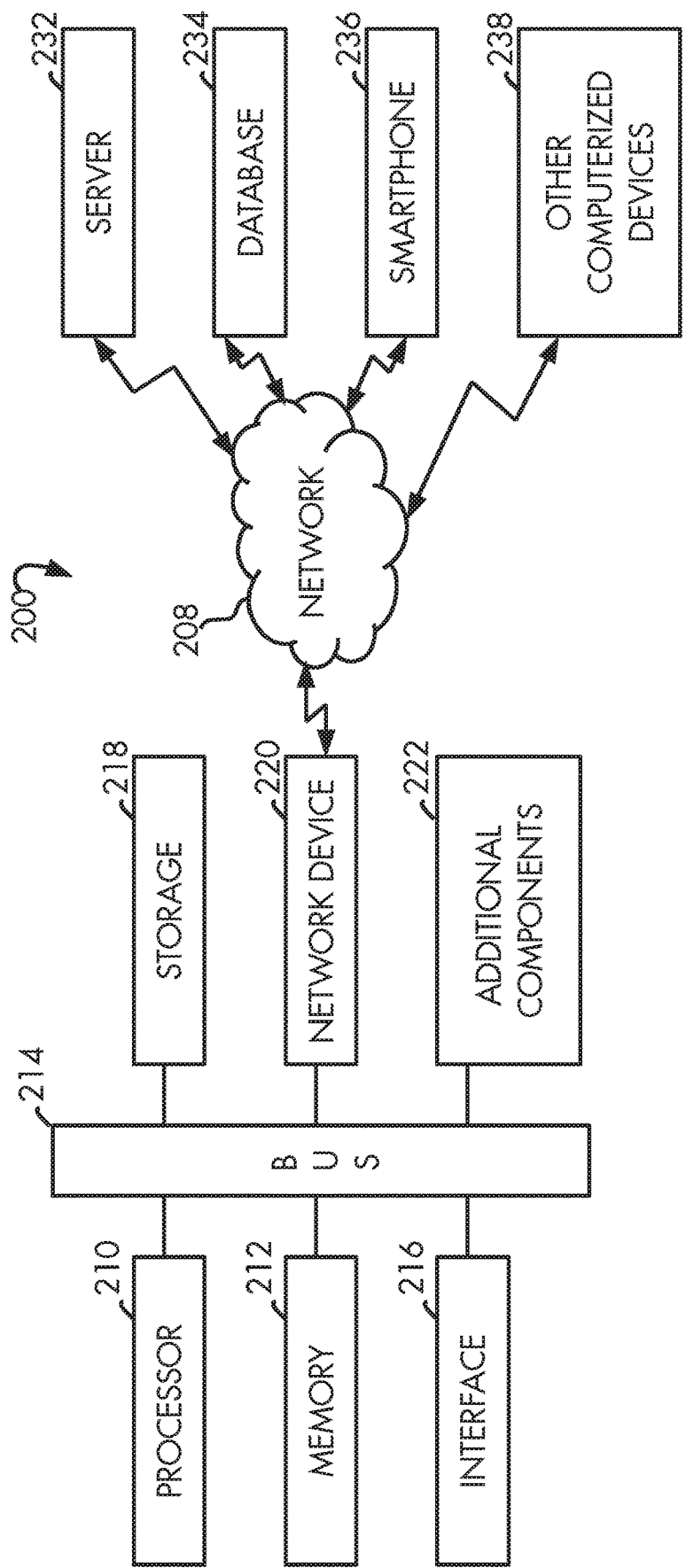
FIG. 2 is a block diagram view of a computerized device, according to an embodiment of this disclosure.

Referring now to FIGS. 1-2, the apparatus for measuring wire and cable length will now be discussed in more detail. The apparatus for measuring wire and cable length may include a housing, battery, communication component, microcontroller, printed circuit board, encoder module, encoder disc, shaft, wire counter, load, and additional components that will be discussed in greater detail below. The apparatus for measuring wire and cable length may operate one or more of these components interactively with other components for using a wireless encoder for wire and cable processing.

The housing will now be discussed in greater detail. FIG. 1 highlights examples of the housing, which may also be shown in other figures. In one example, internal components of the apparatus may be included in a housing 10. The housing may be provided to substantially protect the internal components from external elements and conditions.

The battery will now be discussed in greater detail. FIG. 1 highlights examples of the battery, which may also be shown in other figures. A battery 12 may be included with the internal components. In one example, the battery 12 may be attached to the bottom of a printed circuit board 18. However, those of skill in the art will appreciate additional locations for the battery 12 after having the benefit of this disclosure. In additional embodiments, a power source other than a battery may be provided, without limitation.

The communication component will now be discussed in greater detail. FIG. 1 highlights examples of the communication component, which may also be shown in other figures. The communication component 14 may include a receiver, a transmitter, a device capable of transmitting and receiving, and/or another device that may facilitate communication of data between multiple devices. Devices may include a server, database, server farm, data warehouse, elastic storage solution, the cloud, or other destinations that would be appreciated by a person of skill in the art after having the benefit of this disclosure. The communication component 14 may be operatively connected to a microprocessor 16, for example, via paths on a printed circuit board 18. The communication component 14 may be at least partially installed and/or attached to the printed circuit board 18.

The communication component 14 may include modules to emit and/or receive radio frequency signals. For example, the communication component 14 may transmit the data wirelessly using a RF communication, advantageously enabling historic data, usage data, capability to update a virtual inventory environment, and productivity metrics.

The printed circuit board and microcontroller will now be discussed in greater detail. FIG. 1 highlights examples of the printed circuit board microcontroller, which may also be shown in other figures. The microcontroller 16 may include an integrated circuit capable of performing computer logic, processing digital information, and analyzing data storable in memory. Additional details and embodiments of a computerized device that may be included by and/or interact with the microcontroller 16 is provided below along with the description of FIG. 2. Various additional electronic components may be communicably connected to the microcontroller 16 via the printed circuit board 18. For example, electronic components such as the communication component 14 may be connected to the microcontroller 16 via electrically conducive paths provided by the printed circuit board 18.

In one example, the microcontroller 16 may receive an electronic signal from an encoder module 20 indicative of a detected condition. The electronic signal may include details about the payout of a material by the apparatus. The microprocessor may analyze the electronic signal to determine information about the operation of an apparatus, including the quantity, rate, and other details about the payout of a wire, cable, or other material. The information may be stored digitally and may be communicated with other devices, such as a display, network-connected database, and/or other device.

In another example, the microcontroller 16 may send data to the communication component 14, which may include wireless communication features. The transmitted data may be received by another device to store the data, display current or historic information, prompt a user for future lengths of wire and cable material to be pulled and cut or counted, and/or otherwise be analyzed and presented. The transmitted data may be buffered and/or stored in computer memory.

The encoder module will now be discussed in greater detail. FIG. 1 highlights examples of the encoder module, which may also be shown in other figures. The encoder module 20 may detect the condition of another object, such as an encoder disc 22. The condition may include rotation.

In one example, an emitting portion of the encoder module 20 may emit pulses of light, which may pass through slots and/or apertures in a encoder disc 22. The emitting portion of the encoder module 20 may emit light in a designated pattern, such as using a square wave function. A sensing portion of the encoder module 20 may sense the pulses of light through the encoder disc 22 to determine rotations of the shaft 24, for example, in square wave functions. The encoder module 20 may generate an electronic signal indicative of the sensed condition. For example, the encoder module 20 may generate an electronic signal including data about a rotational speed, duration of rotation, radial length rotated, and/or other conditions.

In one example, the encoder module 20 may include an optical incremental encoder. The encoder module 20 may detect a condition, such as the passing of a encoder disc 24 through at least part of the encoder module 20 interior. The encoder module 20 may transmit data with the electronic signal through to the microcontroller 16, for example, via the printed circuit board 18.

In one example, the encoder module 20 may include a digital incremental encoder that may convert material usage data into usable footage length. The encoder module may communicate wirelessly using a radio frequency (RF) communications protocol, such as via the communication component 14. Furthermore, information determined by the encoder module 20 may be displayed to a user, for example, on a screen locally. The information may also update a cloud database environment for analysis of inventory and productivity. An apparatus enabled by this disclosure may advantageously measure lengths of wire and cable paid out in substantially real-time and transmit this information to a network-connected environment, such as a cloud-based environment.

The encoder module 20 may be communicably connected to the communication component 14. The encoder module 20 may include an incremental encoder operable by providing multiple pulse outputs, such as A and B pulse outputs, that provide no usable count information on their own. Rather, the counting may be performed in the connected and/or external electronics. The counting may begin when the counter in the connected and/or external electronics instruct commencement. This advantageously negates the need for the counting to rely on the position of the encoder module 20.

To assist with providing useful position information, the encoder module 20 position may be referenced to the device to which it is attached, generally using an index pulse. A feature of the encoder module 20 enabled by this disclosure, including an incremental encoder, is that the encoder module 20 may report an incremental change in position of the encoder disc 22 to the counting electronics.

The encoder disc will now be discussed in greater detail. FIG. 1 highlights examples of the encoder disc, which may also be shown in other figures. The encoder disc 22 may be attached and/or otherwise connected to the shaft 24. The encoder module 20 may read the encoder disc 22, for example, as it rotates at least partially within the encoder module 20. In one example, the encoder disc 22 may be positioned in a slot between emitting and receiving portions of the encoder module 20.

The shaft will now be discussed in greater detail. FIG. 1 highlights examples of the shaft, which may also be shown in other figures. The shaft 24 may operatively connect the encoder disc 22 discussed throughout this disclosure to a load 26, such as a spool, reel, or wheel of wire and cable. The load 26 may be installable to the shaft 24 at an end distal to the encoder disc 22. The shaft 24 may additionally connect to a counting machine outside of the housing, which may cause and/or affect rotation of the shaft 24. The shaft 24 may pass at least partially through a portion of the housing 10. For example, the shaft 24 may pass through a shaft aperture of the housing 10.

Referring now to FIG. 2, an illustrative computerized device will be discussed, without limitation. Various aspects and functions described in accord with the present disclosure may be implemented as hardware or software on one or more illustrative computerized devices 200 or other computerized devices. There are many examples of illustrative computerized devices 200 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 200 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 200, among others. Additionally, aspects in accord with the present disclosure may be located on a single illustrative computerized device 200 or may be distributed among one or more illustrative computerized devices 200 connected to one or more communication networks.

For example, various aspects and functions may be distributed among one or more illustrative computerized devices 200 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 2 shows a block diagram of an illustrative computerized device 200, in which various aspects and functions in accord with the present disclosure may be practiced. The illustrative computerized device 200 may include one or more illustrative computerized devices 200. The illustrative computerized devices 200 included by the illustrative computerized device may be interconnected by, and may exchange data through, a communication network 208. Data may be communicated via the illustrative computerized device using a wireless and/or wired network connection.

Network 208 may include any communication network through which illustrative computerized devices 200 may exchange data. To exchange data via network 208, systems and/or components of the illustrative computerized device 200 and the network 208 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 200 may transmit data via the network 208 using a variety of security measures including TSL, SSL, or VPN, among other security techniques. The illustrative computerized device 200 may include any number of illustrative computerized devices 200 and/or components, which may be networked using virtually any medium and communication protocol or combination of protocols.

Various aspects and functions in accord with the present disclosure may be implemented as specialized hardware or software executing in one or more illustrative computerized devices 200, including a illustrative computerized device 200 shown in FIG. 2. As depicted, the illustrative computerized device 200 may include a processor 210, memory 212, a bus 214 or other internal communication system, an input/output (I/O) interface 216, a storage system 218, and/or a network communication device 220. Additional devices 222 may be selectively connected to the computerized device via the bus 214. Processor 210, which may include one or more microprocessors or other types of controllers, can perform a series of instructions that result in manipulated data. Processor 210 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 210 may be connected to other system elements, including a memory 212, by bus 214.

The illustrative computerized device 200 may also include a network communication device 220. The network communication device 220 may receive data from other components of the computerized device to be communicated with servers 232, databases 234, smart phones 236, and/or other computerized devices 238 via a network 208. The communication of data may optionally be performed wirelessly. More specifically, without limitation, the network communication device 220 may communicate and relay information from one or more components of the illustrative computerized device 200, or other devices and/or components connected to the computerized device 200, to additional connected devices 232, 234, 236, and/or 238. Connected devices are intended to include, without limitation, data servers, additional computerized devices, mobile computing devices, smart phones, tablet computers, and other electronic devices that may communicate digitally with another device. In one example, the illustrative computerized device 200 may be used as a server to analyze and communicate data between connected devices.

The illustrative computerized device 200 may communicate with one or more connected devices via a communications network 208. The computerized device 200 may communicate over the network 208 by using its network communication device 220. More specifically, the network communication device 220 of the computerized device 200 may communicate with the network communication devices or network controllers of the connected devices. The network 208 may be, for example, the internet. As another example, the network 208 may be a WLAN. However, skilled artisans will appreciate additional networks to be included within the scope of this disclosure, such as intranets, local area networks, wide area networks, peer-to-peer networks, and various other network formats. Additionally, the illustrative computerized device 200 and/or connected devices 232, 234, 236, and/or 238 may communicate over the network 208 via a wired, wireless, or other connection, without limitation.

Memory 212 may be used for storing programs and/or data during operation of the illustrative computerized device 200. Thus, memory 212 may be a relatively high performance, volatile, random access memory such as a dynamic random access memory (DRAM) or static memory (SRAM). However, memory 212 may include any device for storing data, such as a disk drive or other non-volatile storage device. Various embodiments in accord with the present disclosure can organize memory 212 into particularized and, in some cases, unique structures to perform the aspects and functions of this disclosure.

Components of illustrative computerized device 200 may be coupled by an interconnection element such as bus 214. Bus 214 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and InfiniBand. Thus, bus 214 may enable communications (for example, data and instructions) to be exchanged between system components of the illustrative computerized device 200.

The illustrative computerized device 200 also may include one or more interface devices 216 such as input devices, output devices and combination input/output devices. Interface devices 216 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 216 allow the illustrative computerized device 200 to exchange information and communicate with external entities, such as users and other systems.

Storage system 218 may include a computer readable and writeable nonvolatile storage medium in which instructions can be stored that define a program to be executed by the processor. Storage system 218 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 210 or some other controller may cause data to be read from the nonvolatile recording medium into another memory, such as the memory 212, that allows for faster access to the information by the processor than does the storage medium included in the storage system 218. The memory may be located in storage system 218 or in memory 212. Processor 210 may manipulate the data within memory 212, and then copy the data to the medium associated with the storage system 218 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 200 as shown in FIG. 2. Various aspects and functions in accord with the present disclosure may be practiced on one or more computers having a or components than that shown in FIG. 2. For instance, the illustrative computerized device 200 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 200 may include an operating system that manages at least a portion of the hardware elements included in illustrative computerized device 200. A processor or controller, such as processor 210, may execute an operating system which may be, among others, an operating system, one of the above mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In operation, a method may be provided for using a wireless encoder for wire and cable processing. Those of skill in the art will appreciate that the following methods are provided to illustrate an embodiment of the disclosure, and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Operation of an apparatus enabled by this disclosure may be unique when compared with other known devices and solutions because an apparatus enabled by this disclosure may provide improved wireless transmission capability; display on one or multiple devices substantially simultaneously; and two-way communication from the apparatus to external display and data storage device for error reporting or mechanical freeze when the device has measured beyond intended distances.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. An apparatus for measuring a wire comprising:
    a shaft operatively connected to a reel;
    an encoder disc installed to the shaft distal to the reel;
    an encoder module to detect a condition of the encoder disc and generate an electronic signal indicative of the condition;
    a microprocessor communicably connected to the encoder module to receive the electronic signal;
    a communication component to communicate information with a network-connected database;
    wherein the microprocessor analyzes the electronic signal to determine the information relating to a payout of the wire; and
    wherein the information is at least partially analyzed by a server electronically connected to the network-connected database to track the payout of the wire associated with an inventory of reels.

2. The apparatus of claim 1, further comprising:
    a printed circuit board onto which the encoder module and the communication component is communicably installed.

3. The apparatus of claim 1, wherein the information is viewable via a display.

4. The apparatus of claim 1, wherein the condition of the encoder disc comprises rotation.

5. The apparatus of claim 1, wherein the encoder module comprises:
    an emitting portion to emit light; and
    a sensing portion to sense the light.

6. The apparatus of claim 5, wherein:
    the encoder disc comprises:
        a slot; and
    wherein at least part of the light emitted by the emitting portion passes through the slot prior to being sensed by the sensing portion.

7. The apparatus of claim 1, wherein a load is installable to the shaft distal to the encoder disc.

8. The apparatus of claim 1, further comprising:
    a battery.

9. An apparatus for measuring a material comprising:
    a shaft operatively connected to a reel;
    an encoder disc installed to the shaft distal to the reel;
    an encoder module to detect a condition of the encoder disc and generate an electronic signal indicative of the condition;
    a microprocessor communicably connected to the encoder module to receive the electronic signal and analyze the electronic signal to determine information relating to a payout of the material;
    a communication component to communicate the information with a network-connected database;
    a server electronically connected to the network-connected database to at least partially analyze the information to track the payout of the wire associated with an inventory of reels; and
    a printed circuit board onto which the encoder module and the communication component is communicably installed.

10. The apparatus of claim 9, wherein the information is viewable via a display.

11. The apparatus of claim 9, wherein the condition of the encoder disc comprises rotation.

12. The apparatus of claim 9, wherein the encoder module comprises:
    an emitting portion to emit light; and
    a sensing portion to sense the light.

13. The apparatus of claim 12, wherein:
    the encoder disc comprises:
        a slot; and
    wherein at least part of the light emitted by the emitting portion passes through the slot prior to being sensed by the sensing portion.

14. The apparatus of claim 9, wherein the material is drawn from the reel installed to the shaft distal to the encoder disc.

15. The apparatus of claim 9, further comprising a battery.

* * * * *